Patented Oct. 9, 1945

2,386,264

UNITED STATES PATENT OFFICE 2,386,264

RESILIENT PLASTIC MATERIAL AND PROCESS FOR MAKING IT

Pearlie B. Roberts, Tyler, Tex., assignor, by direct and mesne assignments, of thirty-six per cent to himself, fifteen per cent to himself as trustee, thirty-four per cent to Arthur Squyres, Tyler, Tex., and fifteen per cent to said Squyres as trustee No Drawing. Application June 29, 1943,
Serial No. 492,768

11 Claims. (Cl. 260—821)

This invention relates to the production of a resilient and elastic plastic material. It presents a process for the making of a plastic possessing many of the characteristics of the rubber obtained from *Hevea brasiliensis* without the use of the latex from that plant. This plastic has several advantages over rubber.

This invention concerns the production of a cohesive resilient solid obtained from a viscous liquid which occurs in xerophilous plants, particularly in plants of the family Cactaceae. This solid is derived from coagulated cactus juice.

The art here presented is addressed to the production of a basic material of cohesive and resilient character capable of being utilized in the manufacture of a myriad of commercially useful articles through its further adaptation.

This application is a continuation in part of my co-pending application under Serial No. 461,330, filed October 8, 1942.

A primary object of this invention is to present an art through the exercise of which a basic material can be produced and used as a substitute for *Hevea brasiliensis* rubber, the critical shortage of which latter material needs no discussion.

A further object is the establishment of a process by which this needed basic material can be simply produced from a natural plant presently found in widespread abundance, especially in arid lands. Cactus is available in enormous quantities.

A particular object is the method by which may be created the desired material without the necessity of cultivating plants from which its essential ingredient may be recovered.

A primary object is a process by which may be produced a plastic material capable of being further conditioned by steps involving treatment or integration with other materials to produce ultimate products of varied physical and chemical characteristics.

A further and valued object is the art by which the desirable basic material herein described may be created from available natural substances found in common cactus plants rather than through the arts looking to the production of a somewhat similar basic material by synthetic processes, especially obviating those which require expensive mechanical apparatuses and highly complex technical and chemical procedures.

An important object is a product of resilient plastic character as a composition of matter, having properties herein elsewhere described, which may be utilized as a basic plastic material in the manufacture of a great variety of commercial articles.

The process herein described results in a new product of wide utility. The product is a basic material appearing as a resilient and elastic solid which may be utilized in the production of a vast number of commercial products ordinarily made from the basic latex of the tree *Hevea brasiliensis* or from synthetic plastics.

That a commercial substitute for latex from the rubber tree is vastly valuable needs no exposition. A non-synthetic plastic having new and useful properties and possessing technical and commercial advantages over ordinary synthetic plastics and rubber is obviously a valuable contribution.

A significant value of the art here presented is in its simplicity; for the process is both simple and inexpensive. Likewise the product is more valuable because it is easily and cheaply made.

This basic product which is the subject of this invention is a plastic material of spongy, resilient, elastic and tenacious character; and it is capable of being vulcanized. It may be partially vulcanized by first melting and then allowing it to cool. It may be further vulcanized by the addition thereto of suitable vulcanizing agents.

This basic product is non-inflammable and fire resistant. It is not soluble in petroleum ether, toluene, carbon disulfide, carbon tetrachloride, benzene, gasoline, lubricating oil nor in any of the usual hydrocarbon solvents which successfully dissolve the latex recovered from the rubber tree.

The basic material as a product has the capacity of receiving and adhering tenaciously to new material of the same character. Wounds and ruptures in this material are easily repaired by the addition of more of the same material; and in so doing it is not necessary to employ special solvents or specially treat the surfaces to be united. The surface only needs be clean.

The basic material will readily adhere to other materials such as other plastics, wood, fabrics and metals; and this same advantage and capacity of tenacious adhesion continues over into products made from the basic material so that the ultimate product may be created and remain firmly attached to such wood, fabrics, metals, etc.

Melting the basic material allows it to be readily formed or poured into molds but does not impair its valuable rubber-like qualities such as resiliency, elasticity, cohesion, toughness and the like. In this it differs radically from ordinary tree rubber.

In molding the basic material to any desired form it is not necessary that pressure be employed; but it may be.

The art here disclosed and to be claimed may be broadly practiced, given the requisite plant gum or juice; and for the purpose of definition and exactness the required liquid extracted from the cactus plant will be referred to hereinafter generically as "xerotex."

This art may be practiced by extracting the xerotex from the plant and adding thereto a suitable coagulating agent, such as is hereinafter described.

The juice of the cactus plant appears to have a molecular structure and character presenting a "lubricated molecule," in which one such molecule may be said to slide over another, which fact doubtless makes possible the resilient and elastic properties of the coagulum of this substance.

The cactus plants used to produce the juice are those which yield plainly viscous juice. A simple test disclosing the required viscosity is to dip one's hand into the juice, remove it and spread the fingers. When the threads of liquid between the fingers stretch, then break and snap back to the fingers the viscosity is sufficient. The cactus plants best used are the Opuntia, Echinocactus, Cereus and Echinocereus; but other cactus plants may be used.

Various methods may be used to extract the juice from the plant such as by chopping the plant into small pieces and pressing the chopped parts to force the juice therefrom, then collecting the juice in a suitable container.

One of the simplest ways for effecting this extraction is to feed the leaves, branches and roots of the plant through closely aligned rollers or grinders. This effects a substantial recovery of the juice as a viscous liquid.

A greater recovery can be had from the plant by mangling and severely crushing the leaves and body, and then dumping the resultant mass, including the fibers and the liquid, into a vat to which water is added, and the whole is then stirred. A thinner but still viscous liquid results; and this is more easily separated from the fibers.

This separation can be effected by pressing the mass over a fine sieve which retains most of the fibers and allows the watery juice to pass through.

Increased recovery of xerotex may be had by soaking the fibers of the crushed plants in water until the fibers float, drawing off the juice from the bottom of the container, then pressing out the fibers to recover the liquid remaining in them. This method is especially effective.

However recovered the juice should be cleaned; and further cleansing can be effected by forcing the watery fluid through a filter or strainer. The cleaner the fluid is made the better the resulting product.

The recovered and cleaned liquid is then coagulated into a jelly-like mass of cohesive, resilient material.

Coagulation is brought about by the addition to the xerotex of various substances of which it has been determined that those of protein character may be used. Glues are good coagulants. Animal glues are used. Casein, fish and gelatinous glues are especially effective. So is dry blood.

One of the best coagulants has been found to be a carbohydrate adhesive of saccharide character. Vegetable glues are good coagulants.

Among the satisfactory coagulants are mesquite gum, or gum arabic or gum accacia. Dextrin, which is closely kin to these gums, is a good coagulant. Even brown sugar or molasses will effectively coagulate the mass.

However, gelatinous adhesives have been found especially good coagulants. Commercial animal glues are adhesives of this character.

The gelatinous adhesives such as ossein, chondromucid, elastin, collagen and keratin will effectively coagulate the xerotex. These adhesives contain sulphur; and they differ in the content thereof; but any of them will coagulate the juice recovered from cactus.

The gelatinous adhesives listed in the paragraph next preceding are the sources from which are derived the best animal glues used. Such gelatinous adhesives are often referred to as albumenoids.

Albumenoids bring about coagulation of the xerotex.

Adhesives of organic origin or of saccharide character or of sulphur content coagulate the juice.

Concerning the relative quantity of coagulant necessary to solidify a given quantity of plant juice it has been determined that the drier the climate where the plant grows the more viscous is the plant juice and the less coagulant needed. The quantity of coagulant required varies with this factor and also with the type of coagulant used. Coagulant in dry form should be used.

To a given weight of cactus juice, recovered in the manner herein described, is added from 3% to 75% of commercial animal glue. This glue, preferably in dry form, is introduced into the juice by stirring it in.

The particular cactus plant used and the amount of water in the soil where grown varies the viscosity of the juice, and therefore the amount of coagulant needed.

The Opuntia of the cactus family yields best results by using from 20% to 35% of glue. That is to say that 100 pounds of its juice is mixed with 20 to 35 pounds of coagulant. The other cactus plants used vary in coagulant required from 3% to 75%.

It is important to always observe the fact that cactus juice varies in viscosity. The exceedingly dry lands produce a more voscous juice than the semi-arid lands. The same cactus plant will yield a more viscous juice if it is transplanted from an area of normal rainfall to desert lands where it rarely ever rains.

The extracted juice should be tested for viscosity; and sufficient glue or other coagulating material must be added to the extent necessary to bring about coagulation.

However, the proper quantity of coagulant can easily be determined with juice of varied viscosity because of a simple fact; and this fact is that the balance between the viscous juice and the coagulant appears to be automatic. If an excess of coagulant is introduced the excess does not enter into the compound but remains unused. If a quantity of coagulant insufficient to solidify the entire volume of juice is introduced then it will coagulate only that quantity of juice with which it freely unites, and the excess juice is simply left over unaffected; and it can be poured off. Experience quickly teaches the proper quantities.

After mixing the plant juice and the coagulant the resultant mass should be allowed to set for several hours and at atmospheric temperature, preferably above freezing, whereafter it will be found solidified. It is then ready for use as a basic plastic material. However, to make a smoother mixture after its first solidification it may be gently heated and then allowed to cool. Such heating does not impair the desirable rubber-like qualities of this material.

The resultant coagulated mass is cohesive, tenacious and resilient when formed. When heated it becomes a sticky, thick liquid; but when cooled it is a resilient, elastic solid substance, relatively smooth, and free of the stickiness which characterizes it in its heated state. For the purpose of identifying this basic material made of xerotex to which an organic adhesive has been added and stirred in, resulting in the mixture being coagulated and solidified, it shall be referred to hereinafter as "xeroplastic."

Xeroplastic is easily molded into any desired shape simply by heating it to a more fluid consistency and pouring it into any suitable molds. Pressure is not needed in this operation. Yet it may be used if desired, especially in forcing material into places difficult of access. After it is cool it may be removed from the mold. It then retains its shape permanently; and although it is resilient and elastic and may be distorted from its original shape it will return thereto when the distorting force is removed.

Xeroplastic has many of the general physical properties of commercial rubber from the rubber tree; and of synthetic rubber. But it is chemically unlike either and it has physical advantages over both. It may be heated and molded, as elsewhere herein indicated; it is not dissolved by rubber solvents; it is fire-resistant. It is therefore vastly different from tree rubber.

Xeroplastic can be variously conditioned by further treatments which will affect its properties, such as exposure to heat and pressure and/or the incorporation therein of various minerals and oxides. For instance the addition of metallic oxides, such as those of lead, alter its normal physical properties. Likewise the addition of carbon black conditions it, and its useful life is lengthened thereby. Tannic acid strengthens and preserves it. It may be vulcanized by mineral agents and heat. It may be otherwise hardened and toughened. It may also be made more soft and sponge-like. Thermal treatment conditions it without injuring it. It responds to a wide variety of treatments. As a basic material in manufacturing it has great utility.

However, it is not the purpose of this application to indicate the manifold mutations which may be worked in this basic product by further physical and chemical treatments the better to condition it for the great number of commercial uses to which it may be put.

The processes for making the xeroplastic or basic material (out of which other things can be made) is an important part of this application. However, the basic material as a product is equally important as subject matter herein. They are both taught and presented here.

Although xeroplastic possesses most of the usual advantageous properties of imported commercial natural rubber, such as resilience, elasticity and a plastic nature, it has many advantages thereover.

While such ordinary rubber is soluble in hydrocarbon solvents of the character of benzene, toluene, carbon disulfide and the like, such will not dissolve xeroplastic; and oil does not disintegrate it.

Ordinary commercial rubber and its ordinary products appear to be readily inflammable. However, xeroplastic will not burn or flame. In the presence of heat it will melt. The character of its disintegration appears to be charring on the surfaces exposed to flame. But the applied flame must be supported by other fuel. Xeroplastic will not support combustion. It is therefore fire resistant.

Melting does not destroy the resilient and elastic properties of xeroplastic; and this is quite a superior advantage for a plastic to possess over rubber, natural or synthetic, and over any other plastic materials which it is desired to form by molding.

Fillers, pigments and vulcanizing agents, such as the oxides of metals (lead oxide, iron oxide and the like), carbon, sulphur, and other conditioning materials, can be added to the basic plastic as desired.

The distinguishing characteristics of xeroplastic are numerous. Its novelty is apparent. It is a product capable of wide utilization. It opens new fields, methods and purposes for plastic materials. In short, it is a strikingly new plastic material.

I claim:

1. The process of making plastic material containing protein by adding, as a coagulant, a quantity of dry protein to cactus juice until the juice is coagulated.

2. The process of creating an elastic plastic material which comprises the addition of dry glue to cactus juice in sufficient amount to cause coagulation of the juice.

3. The process of making plastic material by extracting viscous juice from cactus plants and adding dry glue thereto in amounts varying from 3% to 75% by weight of the juice until the mass is coagulated.

4. The process of creating a resilient plastic material containing gelatinous adhesive by extracting the viscous juice of cactus plants and adding thereto, as a coagulant, a sufficient quantity of dry gelatinuous adhesive to cause the resultant mass to be coagulated into a cohesive solid.

5. The process by which is created a resilient plastic, containing albumenoid adhesive, by adding, as a coagulating agent, to the viscous juice extracted from cactus plants, a sufficient quantity of dry albumenoid adhesive to coagulate the resultant mass.

6. A thermo-plastic product derived from the juice of plants of the cactus family and containing from 3% to 75% of glue.

7. As a composition of matter, a solid from the cactus juice containing a quantity of protein material added to the juice in dry form and in sufficient quantity to cause coagulation.

8. A thermo-plastic, elastic, resilient and non-inflammable material containing a quantity of protein, and obtained by adding a sufficient quantity of dry protein as a coagulant to the juice of the cactus.

9. As a composition of matter, a semi-solid plastic material containing protein, cactus juice and a pigment, and obtained by adding a sufficient quantity of dry protein as a coagulant to the juice of the cactus, and also adding a pigment to the compound to effect the coloring desired.

10. As a composition of matter, a plastic material containing cactus juice, a protein and a filler, and obtained by adding a sufficient quantity of dry protein as a coagulant to the juice of the cactus, and also adding a filler to condition the resultant mass.

11. As a composition of matter, a resilient solid containing cactus juice, protein and a vulcanizing agent, and obtained by adding a sufficient quantity of dry protein as a coagulant to the juice of the cactus, and also adding a vulcanizing agent to the compound.

PEARLIE B. ROBERTS.